US012785788B2

(12) United States Patent
Soryal

(10) Patent No.: US 12,785,788 B2
(45) Date of Patent: Nov. 3, 2026

(54) USING UNMANNED MOBILE VEHICLES TO APPLY SURFACES TO REFLECT COMMUNICATION SIGNALS FOR PROVISION AS A SERVICE

(71) Applicant: AT&T Intellectual Property I, L.P., Atlanta, GA (US)

(72) Inventor: Joseph Soryal, Glendale, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1043 days.

(21) Appl. No.: 17/957,920

(22) Filed: Sep. 30, 2022

(65) Prior Publication Data

US 2024/0113768 A1 Apr. 4, 2024

(51) Int. Cl.
*H04B 7/145* (2006.01)
*H04W 40/02* (2009.01)
*H04W 76/10* (2018.01)

(52) U.S. Cl.
CPC ............ *H04B 7/145* (2013.01); *H04W 40/02* (2013.01); *H04W 76/10* (2018.02)

(58) Field of Classification Search
CPC ....... H04B 7/145; H04W 76/10; H04W 40/02
See application file for complete search history.

(56) References Cited

U.S. PATENT DOCUMENTS 9,049,740 B1 * 6/2015 Tillotson .............. G05D 1/0094
2023/0032511 A1 * 2/2023 Horn ........................ H04W 8/02
2024/0022927 A1 * 1/2024 Tong ........................ H04W 4/40
2024/0356625 A1 * 10/2024 Walker ............... H04B 7/15528
2025/0047365 A1 * 2/2025 Echigo ............... H04B 7/15542
2026/0012245 A1 * 1/2026 Farmahini Farahani .................... H04B 7/145

OTHER PUBLICATIONS

"Electromagnetic Field (EMF) Shielding Paints", Less EMF, https://lessemf.com/product-category/emf-shielding/paints/, 2024, 4 pp.
"Satellites Could 3D Print Their Antennas In Space! Tech Under Development", Mitsubishi Electric, https://www.youtube.com/watch?v=cfmKM2a582w, May 22, 2022, 3 pp.

(Continued)

*Primary Examiner* — Faruk Hamza
*Assistant Examiner* — Tito Q Pham
(74) *Attorney, Agent, or Firm* — Guntin & Gust, PLC; Louis Yang

(57) ABSTRACT

The technologies described herein are generally directed to detecting reflective surfaces for use reflecting a signal from access point equipment to destination equipment in advanced networks, e.g., at least a fifth generation (5G) network. For example, a method described herein can include receiving a request to establish a reflective path usable to facilitate a connection between user equipment and access point equipment, resulting in reflected path information corresponding to the reflective path. The method can further include, based on the reflected path information, selecting a location for a reflective surface to facilitate the connection by the access point equipment. The method can further include, facilitating communicating the reflected path information to the access point equipment.

20 Claims, 11 Drawing Sheets

(56) References Cited

OTHER PUBLICATIONS

"System Architecture for the 5G System", Tech-invite, 3GPP space, TS 23.501, https://www.tech-invite.com/3m23/tinv-3gpp-23-501.html, Sep. 2024, 8 pp.
"The Advantages and Challenges of Biodegradable Electronic Components", cadence, PCB Design & Analysis, https://resources.pcb.cadence.com/blog/2021-the-advantages-and-challenges-of-biodegradable-electronic-components, 2021, 7 pp.
Gates, Dominic , https://replica.seattletimes.com/popovers/dynamic_article_popover.aspx?artguid=736a3939-a28f-4923-9bed-2905caf7c62c, 2024, 3 pp.

* cited by examiner

USING UNMANNED MOBILE VEHICLES TO APPLY SURFACES TO REFLECT COMMUNICATION SIGNALS FOR PROVISION AS A SERVICE

TECHNICAL FIELD

The subject application is related to different approaches to handling communication in networked computer systems and, for example, to using reflective surfaces to improve signal propagation.

BACKGROUND

As demand for fast, high-quality wide area network connections have increased, wireless providers have implemented many new technologies, each having advantages and drawbacks over traditional approaches. New, shorter wavelength frequency bands can provide dramatically faster broadband connections to mobile devices, but because these bands can be blocked easier and have narrower beams, positioning transmitters to offer service to user devices in a variety of different locations has been challenging.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
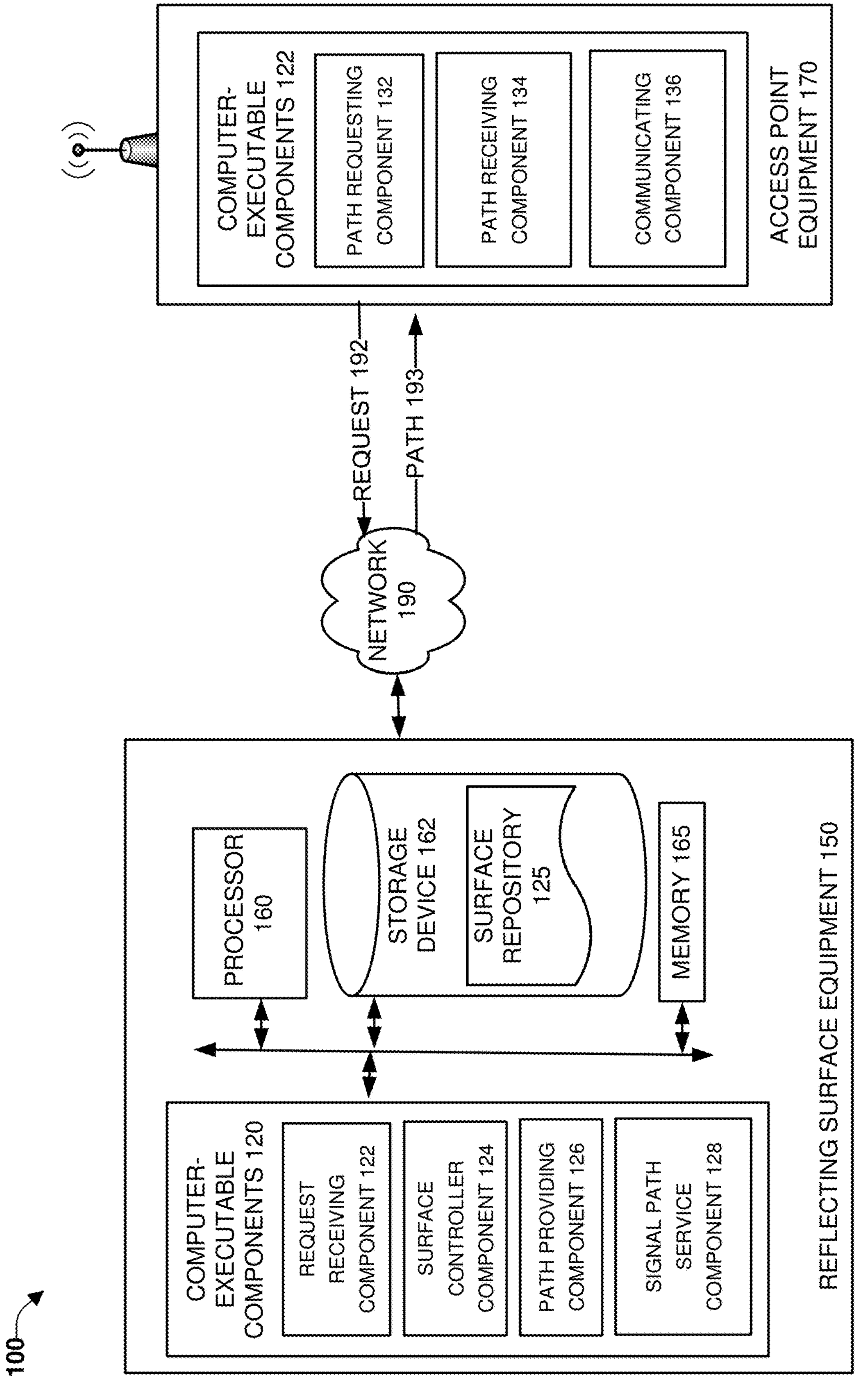
FIG. 1 is an architecture diagram of an example system that can facilitate providing reflective surfaces for use reflecting a signal from access point equipment to destination equipment, in accordance with one or more embodiments.

Generally speaking, one or more embodiments of a system described herein can facilitate using unmanned mobile surfaces to reflect an access point signal to destination equipment. In addition, one or more embodiments described herein can be directed towards a multi-connectivity framework that supports the operation of new radio (NR, sometimes referred to as 5G). As will be understood, one or more embodiments can improve network connectivity, by supporting control and mobility functionality on cellular links (e.g., long term evolution (LTE) or NR). One or more embodiments can provide benefits including, system robustness, reduced overhead, and global resource management.

It should be understood that any of the examples and terms used herein are non-limiting. For instance, while examples are generally directed to non-standalone operation where the NR backhaul links are operating on millimeter wave (mmWave) bands and the control plane links are operating on sub-6 GHz long term evolution (LTE) bands, it should be understood that it is straightforward to extend the technology described herein to scenarios in which the sub-6 GHz anchor carrier providing control plane functionality could also be based on NR. As such, any of the examples herein are non-limiting examples, any of the embodiments, aspects, concepts, structures, functionalities or examples described herein are non-limiting, and the technology may be used in various ways that provide benefits and advantages in radio communications in general.

In some embodiments, understandable variations of the non-limiting terms "signal propagation source equipment" or simply "propagation equipment," "radio network node" or simply "network node," "radio network device," "network device," and access elements are used herein. These terms may be used interchangeably and refer to any type of network node that can serve user equipment and/or be connected to other network node or network element or any radio node from where user equipment can receive a signal. Examples of radio network node include, but are not limited to, base stations (BS), multi-standard radio (MSR) nodes such as MSR BS, gNode B (gNB), eNode B (eNB), network controllers, radio network controllers (RNC), base station controllers (BSC), relay, donor node controlling relay, base transceiver stations (BTS), access points (AP), transmission points, transmission nodes, remote radio units (RRU) (also termed radio units herein), remote ratio heads (RRH), and nodes in distributed antenna system (DAS). Additional types of nodes are also discussed with embodiments below, e.g., donor node equipment and relay node equipment, an example use of these being in a network with an integrated access backhaul network topology.

In some embodiments, understandable variations of the non-limiting term user equipment (UE) are used. This term can refer to any type of wireless device that can communicate with a radio network node in a cellular or mobile communication system. Examples of UEs include, but are not limited to, a target device, device to device (D2D) user equipment, machine type user equipment, user equipment capable of machine to machine (M2M) communication, PDAs, tablets, mobile terminals, smart phones, laptop embedded equipped (LEE), laptop mounted equipment (LME), USB dongles, and other equipment that can have similar connectivity. Example UEs are described further with FIGS. 10 and 11 below. Some embodiments are described in particular for 5G new radio (NR) systems. The embodiments are however applicable to any radio access technology (RAT) or multi-RAT system where the UEs operate using multiple carriers, e.g., LTE. Some embodiments are described in particular for 5G new radio systems. The embodiments are however applicable to any RAT or multi-RAT system where the UEs operate using multiple carriers, e.g., LTE.

One having ordinary skill in the relevant art(s), given the disclosure herein, understands that the computer processing systems, computer-implemented methods, equipment (apparatus) and/or computer program products described herein employ hardware and/or software to solve problems that are highly technical in nature (e.g., rapidly and dynamically utilizing mapped reflective surfaces to direct communication beams), that are not abstract and cannot be performed as a set of mental acts by a human. For example, a human, or even a plurality of humans, cannot efficiently manage the complex reflected paths (which generally cannot be performed manually by a human) with the same level of accuracy and/or efficiency as the various embodiments described herein.

Aspects of the subject disclosure will now be described more fully hereinafter with reference to the accompanying drawings in which example components, graphs and selected operations are shown. In the following description, for purposes of explanation, numerous specific details are set forth in order to provide a thorough understanding of the various embodiments. For example, some embodiments described can facilitate detecting reflective surfaces for use reflecting a signal from access point equipment to destination equipment. Different examples that describe these aspects are included with the description of FIGS. 1-13 below. It should be noted that the subject disclosure may be embodied in many different forms and should not be construed as limited to this example or other examples set forth herein.

FIG. 1 is an architecture diagram of an example system 100 that can facilitate providing reflective surfaces for use reflecting a signal from access point equipment to destination equipment, in accordance with one or more embodiments. For purposes of brevity, description of like elements and/or processes employed in other embodiments is omitted. As depicted, system 100 includes reflecting surface equipment 150 communicatively coupled to access point equipment 170 via network 190.

Reflecting surface equipment 150 can include computer-executable components 120, processor 160, storage device 162 and memory 165. Storage device 162 can include surface repository 125. Computer-executable components 120 can include request receiving component 122, surface controller component 124, path providing component 126, and other components described or suggested by different embodiments described herein, that can improve the operation of system 100. Access point equipment 170 can include computer-executable components 122, including path requesting component 132, path receiving component 134, communicating component 136, and other components described or suggested by different embodiments described herein, that can improve the operation of system 100. As depicted, access point equipment communicates request 192 (e.g., by path requesting component 132) to reflecting surface equipment 150 via network 190, e.g., received by request receiving component 122. Based on different operations described herein, reflecting surface equipment 150 can (e.g., by path providing component 126) provide path 193 to access point equipment 170, via network 190.

Generally speaking, as described herein, access point equipment 170 can request routing a communications signal via reflection from a transient reflective surface placed for use by access point equipment 170 and other communications sessions, e.g., for reasons including routing around connection issues discussed with FIG. 2 below. It is appreciated that connection issues that can be mitigated by embodiments can include one or more conditions that affect the transmission of communication beams (e.g., radio waves, light beams, sound waves) along a signal path from a transmitting device to a receiving device.

With respect to all signal receiving equipment described herein, it is appreciated that one or more embodiments can be used to provide replacement or additional signals for different types of communication (e.g., for control signals and/or customer communication signals). One having ordinary skill in the relevant art(s), given the description herein, understands how one or more embodiments can beneficially provide additional signal streams to destination devices with multiple input capabilities, e.g., as part of multiple input/multiple output (MIMO) capabilities.

Thus, in an example, when quality of a communications session with user equipment 280 (e.g., via direct signal path 146) is identified as being below a threshold level of quality (e.g., resulting in a low-quality signal), one or more embodiments can request additional paths based on reflected signals from reflecting surface equipment 150 to provide alternative or additional (e.g., via MIMO capabilities of user equipment 280) signals to improve the quality of the communications session.

With respect to the uplink communication capabilities of user equipment 280, based on the disclosure herein, it is appreciated that surface repository 125 and transient reflective surface 250 can also, in one or more embodiments described herein, be used by user equipment 280 to communicate uplink signals to access point equipment 170, e.g., to avoid connection issues 297 or to supplement MIMO communications by utilizing both the reverse of direct signal path 146 and the reverse of reflected signal 149. It should be noted that, to facilitate the use of transient reflective surface 250 for reflection of signals from user equipment 280 to access point equipment 170 can utilize capabilities of user equipment 280 to transmit signals in a particular direction, e.g., these capabilities being now known or developed in the future.

Continuing the discussion of reflecting surface equipment 150, it should be appreciated that these components, as well as aspects of the embodiments of the subject disclosure depicted in this figure and various figures disclosed herein, are for illustration only, and as such, the architecture of such embodiments are not limited to the systems, devices, and/or components depicted therein. For example, in some embodiments, reflecting surface equipment 150 can further comprise various computer and/or computing-based elements described herein with reference to mobile handset 900 of FIG. 9, and operating environment 1000 of FIG. 10. For example, one or more of the different functions of network equipment can be divided among various equipment, including, but not limited to, including equipment at a central node global control located on the core Network, e.g., mobile edge computing (MEC), self-organized networks (SON), or RAN intelligent controller (RIC) network equipment.

In some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1306 and FIG. 13. Such examples of memory 165 can be employed to implement any embodiments of the subject disclosure.

According to multiple embodiments, storage device 162 can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer.

According to multiple embodiments, processor 160 can comprise one or more processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more components including, but not limited to, a central processing unit, a multi-core processor, a microprocessor, dual microprocessors, a microcontroller, a system on a chip (SOC), an array processor, a vector processor, and other types of processors. Further examples of processor 160 are described below with reference to processing unit 1000 of FIG. 10. Such examples of processor 160 can be employed to implement any embodiments of the subject disclosure.

In one or more embodiments, computer-executable components 120 can be used in connection with implementing one or more of the systems, devices, components, and/or computer-implemented operations shown and described in connection with FIG. 1 or other figures disclosed herein. For example, in one or more embodiments, computer-executable components 120 can include instructions that, when executed by processor 160, can facilitate performance of operations defining request receiving component 122. As discussed with FIG. 2 below, request receiving component 122 can, in accordance with one or more embodiments, receive request 192 from access point equipment 170 to establish a communications session between access point equipment 170 and a user equipment (depicted in FIG. 2).

Further, in another example, in one or more embodiments, computer-executable components 120 can include instructions that, when executed by processor 160, can facilitate performance of operations defining surface controller component 124. As discussed further below, surface controller component 124 can, in accordance with one or more embodiments, based on the reflected path information, select, by the reflective surface equipment, a location for a reflective surface to facilitate the connection by the access point equipment.

In yet another example, computer-executable components 120 can include instructions that, when executed by processor 160, can facilitate performance of operations defining path providing component 126. As discussed herein, in one or more embodiments, path providing component 126 can in response to the request, communicate to the access point equipment, the reflected path information. For example, one or more embodiments can facilitate communicating the reflected path 193 information to access point equipment 170.

In additional or alternative embodiments, computer-executable components 120 can include instructions that, when executed by processor 160, can facilitate performance of operations defining signal path service component 128, e.g., for one or more embodiments to provide signal path information as a service to different requesting entities (also termed smart material as a service signal controller). In different implementations, different entities can receive reflective signal paths on demand as needed, e.g., based on a provided surface.

As is appreciated by one having ordinary skill in the relevant art(s), given the description herein, computer-executable components 122 of access point equipment 170 can include instructions that, when executed a similar to processor 160, can facilitate performance of operations defining path requesting component 132. As discussed further with FIG. 2 below, in one or more embodiments, path requesting component 132 can, based on the reflected path information, select a location for a reflective surface to facilitate the connection by the access point equipment. In different examples, path requesting component 132 can select a location for a surface generating device, e.g., as unmanned aerial vehicle as discussed with FIG. 2 below.

Computer-executable components 134 of access point equipment 170 can further include instructions that can facilitate performance of operations defining path receiving component 134. As discussed further with FIG. 2 below, in one or more embodiments, path receiving component 134 can receive from the second network device, the path to the third network device, and based on the selected path, the second network device can generate a transient reflective surface at a geographic location to facilitate the connection to the third network device by relaying the form of signal in accordance with the selected path. As discussed herein, in one or more embodiments, path providing component 126 can in response to the request, communicate to the access point equipment, the reflected path information. For example, one or more embodiments can facilitate communicating the reflected path 193 information to access point equipment 170.

Computer-executable components 122 of access point equipment 170 can further include instructions that can facilitate performance of operations defining communicating component 136. As discussed further with FIG. 2 below, in one or more embodiments, communicating component 136 can, to facilitate the connection being established with the third network device via the path, communicate a signal of the form of signal directed toward the geographic location.

Additional approaches to identifying, selecting, and utilizing transient reflective surfaces that can be used by one or more embodiments are discussed with the descriptions of FIG. 2 below.

Figure 2:
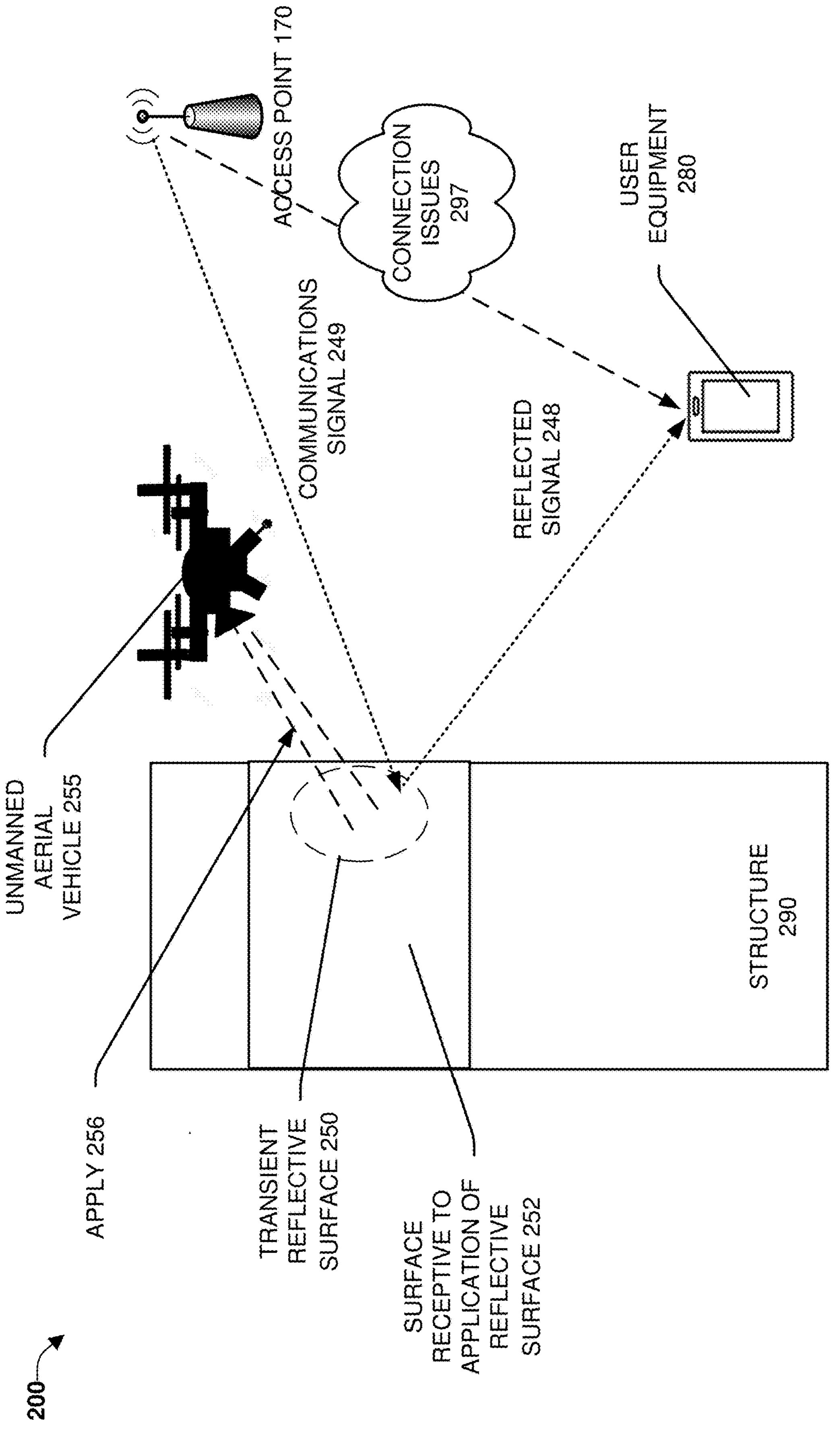
FIG. 2 is a diagram of a non-limiting example system that can facilitate using placement of transient reflective surfaces to reflect an access point signal to destination equipment, in accordance with one or more embodiments.

FIG. 2 is a diagram of a non-limiting example system 200 that can facilitate using placement of transient reflective surfaces to reflect an access point signal to destination equipment, in accordance with one or more embodiments. For purposes of brevity, description of like elements and/or processes employed in other embodiments is omitted.

System 200 as depicted includes a representation of access point 170 has a direct signal path to user equipment 280, with this signal having connection issues 297. Also, in accordance with one or more embodiments, as depicted access point 170 communicates communication signal 249 toward transient reflective surface 250 of structure 290. Reflected off of transient reflective surface 250, reflected signal is received by user equipment 280. As discussed further below, unmanned aerial vehicle 255 can mount transient reflective surface 250 based on structure 290 being determined to have a surface receptive to mounting of the reflective surface 252.

With respect to reflected signal 249 (as well as other reflected signals discussed herein), one having skill in the relevant art(s), given the description herein, understands that, as used to describe one or more embodiment herein, a reflected beam can be along a path according to which the beam is relayed by the surface to the user equipment at a first angle corresponding to a second angle at which the second signal strikes the surface. Further to this, it is noted that example signal paths shown in various drawings herewith are approximations meant to be used to illustrate different concepts described herein, and are not meant to show particular reflection angles, distances, and other path characteristics.

Storage device 162 of reflective surface 150 is an example of a storage component that can store information relevant to achieving reflected signal 248 reaching user equipment (e.g., surface repository 125), this information including but not limited to, the location of structure 290, receptive surface 252, the performance of transient reflective surface 250 with a particular mode of communication, information about the location of user equipment 280 and access point 170, the absolute orientation (e.g., heading) of transient reflective surface 250, the relative location of transient reflective surface 250 relative to access point equipment 170 and/or user equipment 280, characteristics of transient reflective surface 250 and receptive surface 252 (e.g., reflective capability, times when surface is available, and limitations on use of transient reflective surface 250, e.g., laser signals can be limited to areas without susceptible entities. In additional or alternative embodiments, surface repository can be implemented by a database and can include a local RF/WiFi/optical frontend database (e.g., signal paths from traditional participant WiFi nodes in an area, and optical signal paths), an access management function (AMF) database that can be implemented as a global database stores paths overlaid on geographical maps, and a WiFi/optical router database and map that can contain information about the locations, capabilities, and the demand for the WiFi and optical routers who are subscribed to the signal path as a service provided by one or more embodiments, e.g., by signal path service component 128.

One having ordinary skill in the relevant art(s), given the description herein, understands additional characteristics that can be stored in surface repository 125 that can affect how transient reflective surface 250, can provide the different functions described herein, e.g., directing reflected signal 149 to user equipment 280. It is also appreciated that storage device 162 is a non-limiting example location for surface repository 125, with other beneficial locations of part or all of this repository being selected based on implementation specific factors, e.g., storage at access point equipment 170 and/or user equipment 280.

As described herein, one or more embodiments can not only map transmission of communication signal 249 to be reflected to user equipment 280 via transient reflective surface 250, embodiments and selectively apply 256 (also termed mount, place, generate herein) transient reflective surface 250 in response to request 192. It should be noted that transient (also termed temporary or semi-permanent herein) reflective surface 250 used by some embodiments herein can be used to affect the transmission of communication beams (e.g., radio waves, light beams, sound waves) along a signal path from a transmitting device to a receiving device. In embodiments, transient reflective surface 250 can be a thin layer of reflective material temporarily placed on receptive surface 252, e.g., water that evaporates at a predictable rate, a temporary paint that can also evaporate or be dissolved by precipitation. In additional, or alternative, embodiments, three dimensional transient reflective surfaces can be generated and placed, e.g., a cone or other shape.

With reference to the materials discussed herein for generating the reflective surfaces, after placement, one or more embodiments can collect (e.g., by unmanned aerial vehicle 255) the materials placed for recycling and reuse, e.g., by the unmanned aerial vehicle 255 for a different placed transient reflective surface. In one or more embodiments, materials can be selected based on the environment and the required reflective capabilities of the surface to be placed. For example, when selecting placement location, material, and duration, as well as predicting how long the placed surface will be useful, one or more embodiments can evaluate weather and environmental conditions. Receptive surface 252 can be evaluated based on different requirements, and selected locations for application 256 can include building roofs, side walls, e.g., where it is evaluated that the material can be applied. It is appreciated by one having ordinary skill in the relevant art(s), given the description herein, that dynamic application and systematic use of the types of reflective surfaces described herein, can result in an additional network for reliable supplementation of other network resources.

Notwithstanding the characteristics of the applied surfaces discussed above, it should be noted that the spirit of embodiments can also be implemented in to be permanent or semi-permanent. Also, while the reflectivity of materials described above (e.g., water, paint) generally are not adjusted, in additional, or alternative, embodiments, reflectivity can be remotely controlled after application, e.g., by placement of a device that changes characteristics of the two or three-dimensional surface. An example factor that can be evaluated by embodiments to adjust reflectivity includes the adjusting of reflective surfaces that to reduce signal interference in an area, e.g., detected by devices and relayed to be analyzed by embodiments.

In an example where reflectivity of reflective surfaces can be beneficially changed by one or more embodiments, a level of signal interference in an area may be identified by different operations (e.g., reports from user equipment and access points). Signals interference can, in some circumstances, be caused or aggravated by reflections of signals off of reflective surfaces in an area. In one or more embodiments, based on an identification and analysis of sub-optimal signals within an area (e.g., by reflective interference), the reflectivity of controllable surfaces can be adjusted specifically to improve the quality of signals in the area (e.g., by reducing the reflective interference). Another example of this is the propagation of certain signals near airports, with one or more embodiments analyzing the signal propagation for potential effects upon airport operations and adjusting reflectivity of controllable surfaces to avoid the effects. Additionally, upon identifying unwanted effects in any area (e.g., near an airport), one or more embodiments can specifically place reflective surfaces at locations where the surfaces can either beneficially reflect the signals for use away from the area or stop the propagation of the signals with a non-reflective surface.

In one or more embodiments, a system for providing reflective surfaces for reflection of communication signals can include unmanned mobile vehicles, e.g., unmanned aerial vehicle 255 or other types of land-based or marine unmanned vehicles. In some implementations, unmanned aerial vehicle 255 (also termed a "drone" in some of the relevant art(s)) can fly over areas served to provide transient reflective surface 250. In an example, unmanned mobile vehicles can operate as self-navigating, autonomous devices that can move to different locations based on one or more factors including, but not limited to, predictions (e.g., made by approaches that include the machine learning approaches of FIG. 5) that supplemental coverage may be required in an area predicted to be congested, an indication that high-priority users (e.g., first responders) may require additional capacity in an area, and indications of actual or predicted types of other connection issues 297, as discussed with FIG. 1 above.

As described with FIGS. 1 and 2 above, in one or more embodiments, in response to the request from access point equipment to establish a communications session between access point equipment 170 and user equipment 280, in the information retrieval from surface repository 125 can include information describing characteristics of transient reflective surface 250, e.g., location, orientation of transient reflective surface 250, reflectiveness of transient reflective surface 250 and other similar criteria that can be used to direct reflected signal 248. Based on this location, transient reflective surface 250 can be used to direct reflected signal 248 to user equipment 280.

One having ordinary skill in the relevant art(s), given the descriptions herein, understands that connection issue 297 conditions can include signals congestion, interference, and blockages. In one or more embodiments, connection issues 297 can also broadly include conditions that can detract from signals being communicated to user equipment 280 on a priority basis, e.g., when user equipment 280 is designated as being used by first responders, additional communication beams can be used to improve one or more aspects of connections therewith. Further to this point, it should be appreciated that one or more embodiments can use reflected signal 149 as a supplement to otherwise unimpeded direct signal path 146, e.g., providing additional communication signals to user equipment 280 as a MIMO device.

Alternatively, or additionally, a circumstance can exist where unmanned aerial vehicle is not in a location where transient reflective surface 350A can be used for reflection. In this circumstance, surface controller component 124 can instruct unmanned aerial vehicle 355 to move to a more advantageous location for extending coverage, e.g., based on tracking the locations and requirements of network devices, e.g., moving user equipment 380. In addition, unmanned aerial vehicle 355 can have control over different reflective characteristics of the reflections that can be provided. For example, in one or more embodiments, transient reflective surface 350A can be adjusted independent of unmanned aerial vehicle 355, with this capability facilitating in some circumstances the directing of reflected signal 348A to be directed at moving user equipment 380 while the user equipment is also moving.

In some implementations where multiple unmanned aerial vehicles 355 can be controlled to work together, these vehicles can be instructed to interwork (cluster) together as a cloud for service delivery, e.g., autonomously and temporarily forming a flying cloud to serve a purpose, task, mission, such as a self-contained and self-managed cluster/cloud, or a data center. In these circumstances different participating unmanned aerial vehicles 355 can be designated as commanding nodes for commanding other unmanned aerial vehicles 355 nearby. In an approach to selecting commanding nodes, these nodes can be selected based on the integrity and security of previous node operation, e.g., from records of operation stored in a blockchain.

In one or more embodiments, commanding nodes can dictate the locations and positions of other nodes so as to address the goals of the current mission, e.g., a game, an emergency, or supplementary coverage in a congested area. In one or more embodiments commanding nodes can dictate the functionality of each node. Because each node can use a software defined platform, the commanding node can designate nodes to have different roles, e.g., an authenticator, a firewall, a mobility manager, a handoff functionality coordinator, public switched telephone network (PSTN) gateway, etc. In other examples of unmanned aerial vehicles 355 working in a coordinated fashion, vehicles can be arranged in formations with a purpose of saving power.

In the examples depicted, unmanned aerial vehicle 355 can include a transient reflective surface 350A that can be temporarily rendered reflective by reflective precipitation, e.g., rain, snow, hail, sleet, and ice can be reflective. Access point 310 communicates by transmitting communication signals 349A transient reflective surface 350A, e.g., based on predictions provided by surface controller component 124, as discussed above.

As is understood by one having ordinary skill in the relevant art(s), given the description herein, beam mapping component 222 can use a variety of different types of information to gather information for predicting the usability of transient reflective surfaces 350A-B for signal reflection. Information sources can include, as discussed with FIG. 2 above, surface information gathered by network components (e.g., access points 210A-B and user equipment 275A-B) over time, e.g., checking locations for the occasional presence of reflective surfaces, e.g., a parking lot, a roadway, train tracks, bodies of water, windows and doors that open and close, etc., can all have moving reflective surfaces that can be detected, tracked, and modeled so as to facilitate predictions.

Additional information that can be used to supplement the collected information includes, but is not limited to, maps that include locations that can be determined to potentially have reflective surfaces available (e.g., roads, train tracks, parking lots, buildings, etc.), transportation schedules describing the movement of buses and trains, sports schedules describing when parking lots are predicted to be full.

In addition, one or more embodiments can receive information from the moving surfaces as to their present and future locations, e.g., the bus operator of vehicle 378A can be offered incentives to provide real time tracking information about the movement of vehicles 378B, e.g., location, direction, and velocities on the roadway of both mobile user equipment 380 and vehicle 378A. In addition, the velocities and other movement characteristics of traffic on the roadway generally can be used to predict the locations of the network elements discussed.

It should be noted that, although mobile user equipment 380 and transient reflective surface are depicted as moving (e.g., with vehicle 379), one having ordinary skill in the relevant art(s), given the description herein appreciates that any combination of the three network components can be mobile or stationary, e.g., access point 310 can also be mobile and, in some implementations, receiving surface and destination tracking information from both mobile user equipment 380 and vehicle 379.

In an additional, or alternative, embodiment, transient reflective surface 350B can be a surface positioned on unmanned terrestrial vehicle 381, e.g., a driverless vehicle that, instead of only being used for ground transportation is instructed to navigate to different locations to facilitate the reflective distribution of communication signals, e.g., as discussed above. In one or more embodiments, while certain normal surfaces of different reflective objects can be naturally reflective (e.g., glass and shiny metal that are exposed on unmanned terrestrial vehicle 379) additional incentives can be offered that can cause specially provided reflective surfaces to be added to vehicles, buildings, and other potentially reflective objects, e.g., reflective paint and other attachable surfaces.

It should be noted that, in additional implementations, approaches similar to those discussed above that can be used to locate moving vehicles for use reflecting signals, can also be used to specifically avoid the use of certain vehicles for reflective purposes. For example, when a schedule, data feed, or other provided data source indicates that an aircraft is predicted to be in a particular space, one or more embodiments can use this information to avoid transmitting signals towards the aircraft. This can be useful for use in areas where reflective surfaces, such as building windows, are detected and designated for use above the altitude of potential aircraft in the area, e.g., one or more embodiments can distinguish between usable and unusable reflective surfaces.

Another type of transient reflective surface that can be used by one or more embodiments includes surfaces that can be rendered temporarily reflective by reflective precipitation 341, e.g., by rain or other precipitation adhered to the precipitation-holding material. For example, a weather forecast for, or real time weather observation of weather 342 can indicate that reflective precipitation 341 is predicted to change the reflective characteristics of transient reflective surface 350B.

In one or more embodiments, a 3D printer contained onboard unmanned aerial vehicle 250 can generate reflective surfaces for placement, e.g., by printing a shape with windows that, when moved to be flushed with the surface, can make a surface reflector, that when folded inside the shape, can either absorb or reflect the an incoming signal, depending on the formation materials selected. In one or more embodiments, the 3D printer can access an artificial intelligence/machine learning module can provide guiding information regarding reflection and detection of surfaces. In one or more additional or alternative embodiments, placing a reflective surface can be termed 'activation' of the surface, and this activated surface can be deactivated in different ways, e.g., by including a heating element that can cause a placed reflective surface to evaporate at a selected deactivation time.

In an example process whereby embodiments can utilize signal propagation principles to select the composition and placement of transient reflective surface 250, for use by access point equipment 170 and user equipment 280 (e.g., determined by location determining technology of user equipment 280, or estimated by access point equipment 170). One having ordinary skill in the relevant art(s), given the description herein, appreciates that signal reflection paths can be estimated based on the signal transmission point (e.g., the location of access point equipment 170), the location and orientation of a reflective surface (e.g., transient reflective surface 250) at the time of the reflection, and the destination of the signal, e.g., user equipment 280.

Additional factors that can affect the propagation of signals described by some embodiments herein include, but are not limited to, the transmission strength of the signal, e.g., varying based on factors including the reflective capability of transient reflective surface 250 and the distances of the elements the reflected signal path. Other factors include the time for the connection, e.g., some surfaces vary in their availability based on environmental factors, different dates and times, and whether the surface that can facilitate the connection is a moving surface. One having ordinary skill in the relevant art(s), given the description herein, appreciates that modern processing power can enable the rapid (e.g., changes made in milliseconds) selection and modification of factors including the location of composition of temporary surfaces selected for reflection, signals to be aimed, transmission strengths to be selected.

One or more embodiments with some of the features described above (e.g., provision of signal paths as a service, support for different forms of communication) can provide a system where communications between the standard RAN can be augmented by communications via optical communications, with aspects of this combined optical/RAN system being termed herein an open optical RAN (abbreviated $O^2$RAN or O2RAN in some circumstances). An example component that can be used to implement different aspects of the open optical RAN discussed with FIGS. 3, 4, and 5 below includes a network component that can provide an access management function (AMF) to different forms of communication discussed herein.

Figure 3:
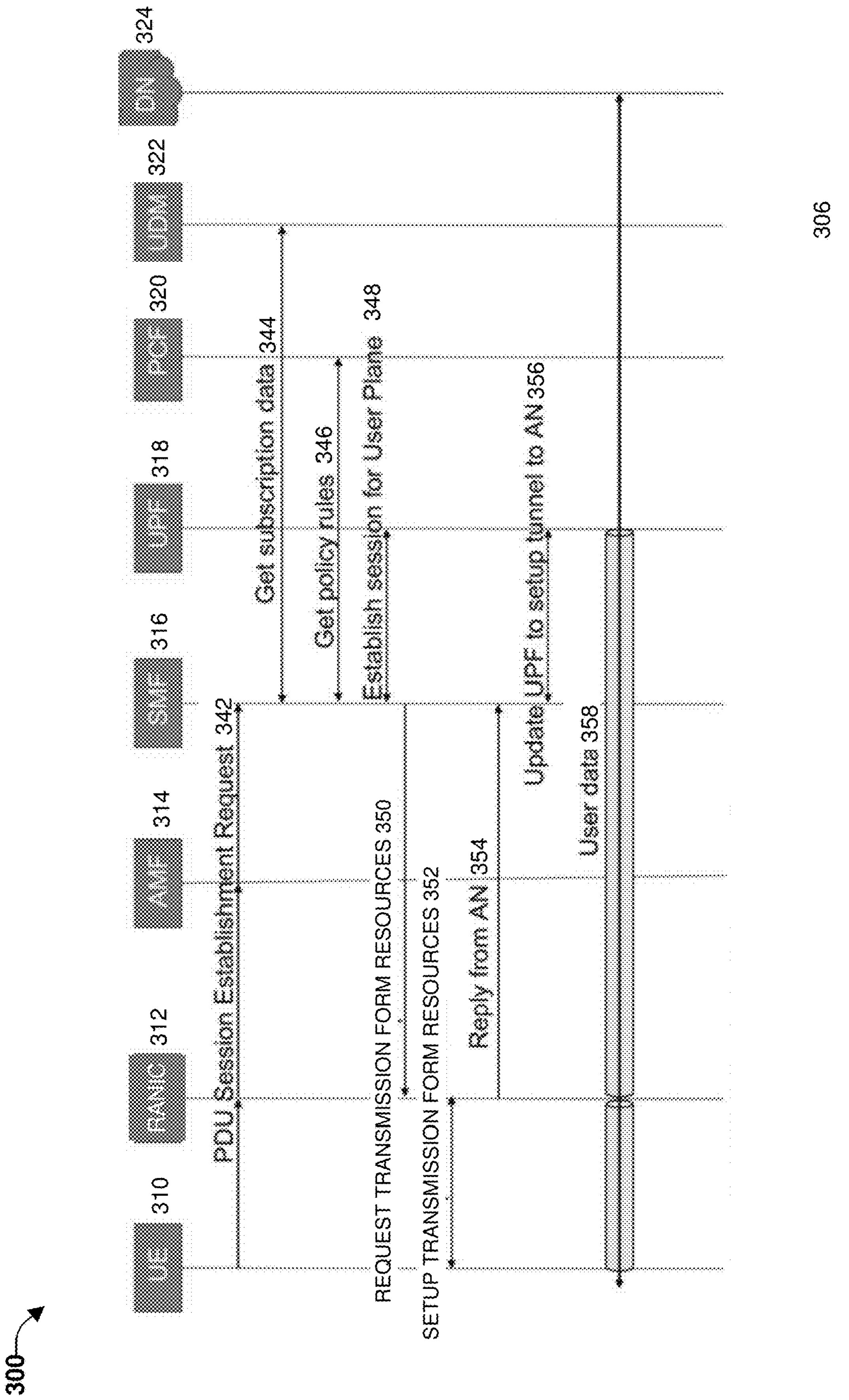
FIG. 3 depicts an example signal diagram that can facilitate using unmanned mobile surfaces to reflect an access point signal to destination equipment, in accordance with one or more embodiments.
Figure 4:
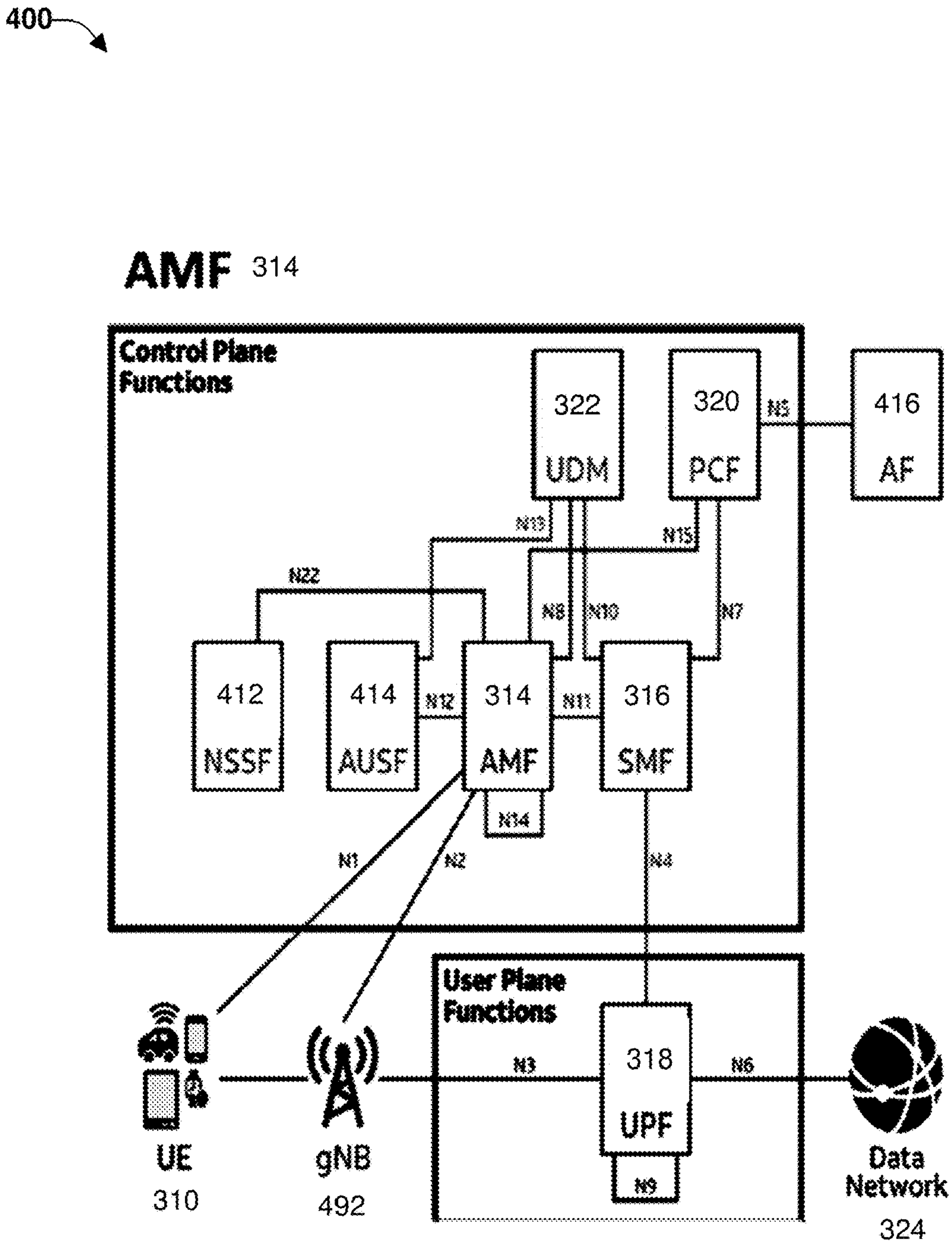
FIG. 4 depicts an example architecture diagram that can facilitate using unmanned mobile surfaces to reflect an access point signal to destination equipment, in accordance with one or more embodiments.
Figure 5:
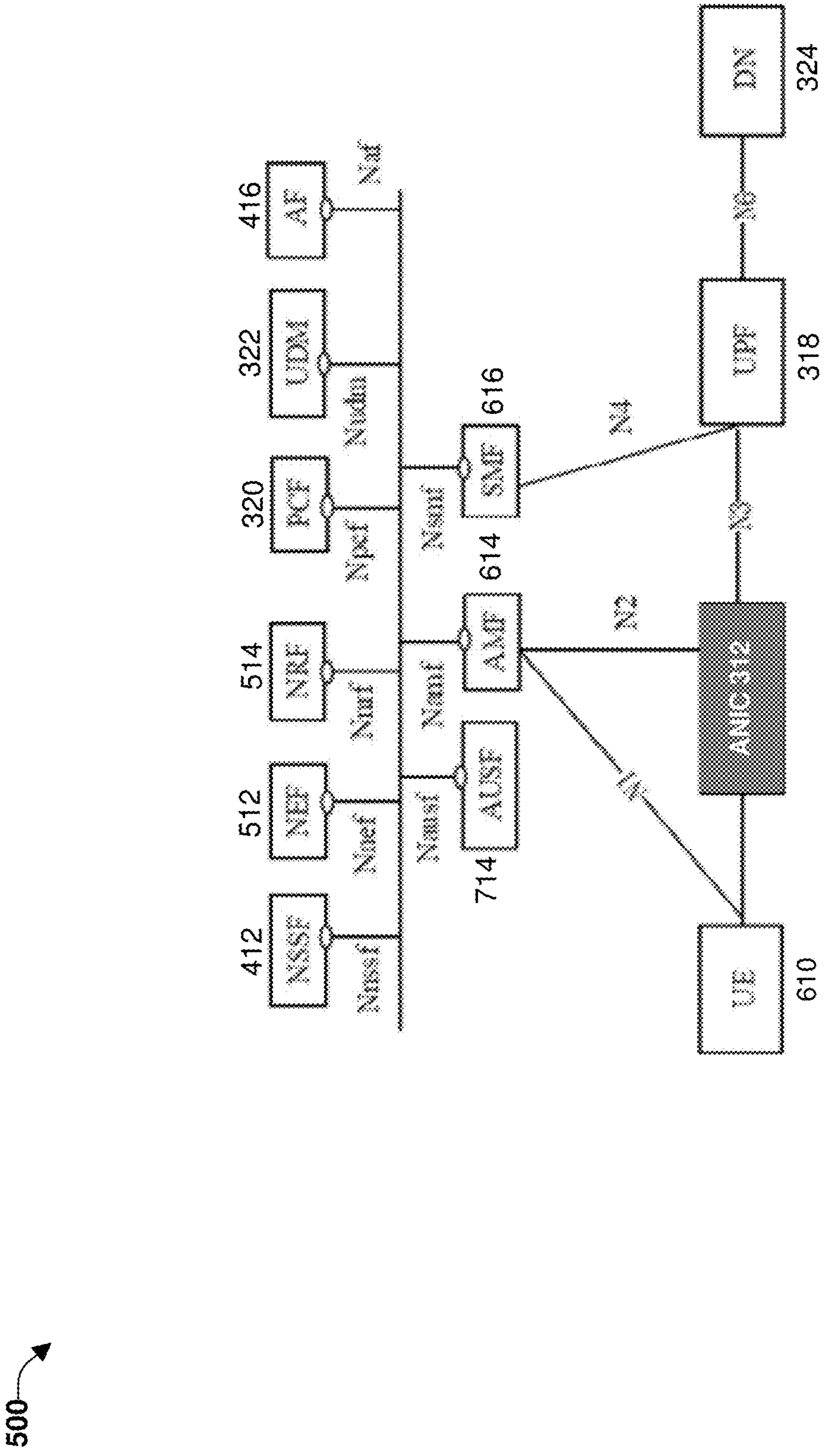
FIG. 5 depicts an example architecture diagram that can facilitate using unmanned mobile surfaces to reflect an access point signal to destination equipment, in accordance with one or more embodiments.

FIGS. 3, 4, and 5 respectively depict an example signal diagram 300, and architecture diagrams 400 and 500 that can facilitate using unmanned mobile surfaces to reflect an access point signal to destination equipment, in accordance with one or more embodiments. For purposes of brevity, description of like elements and/or processes employed in other embodiments is omitted. Signal diagram 300 illustrates a non-limiting example sequence of events that illustrates how existing 5G core virtual network functions (VNFs) and elements of the 5G RAN (e.g., gNBs) can be configured to facilitate handshaking for scanning expanded coverage areas enabled by reflective surfaces.

Illustrative components of signal diagram 300 include UE 310, access network intelligent controller (ANIC) 312, access management function (AMF) 314, session management function (SMF) 316, user plane function (UPF) 318, policy control function (PCF) 320, unified data management (UDM) 322, and data network (DN) 324. Non-limiting architecture diagram 400 of FIG. 4 includes some of the above noted components of FIG. 3, as well as network slice selection function (NSSF) 412, authentication server function (AUSF) 414, gNB 492, and application function (AF) 416. Non-limiting architecture diagram 500 of FIG. 5 includes some of the above noted components of FIGS. 3 and 4, as well as network exposure function (NEF) 512, and network repository function (NRF) 514.

At 342, a protocol data unit (PDU) session establishment request is communicated from UE 310 to SMF 316 via AN 312 and AMF 314. At 344, a get subscription data message is relayed from SMF 316 to UDM 322, via UPF 318 and PCF 320. At 346, a get policy rules message is communicated from SMF 316 to PCF 320, via UPF 318. At 348, SMF 316 establishes with UPF 318, a session for the user plane.

At 350, based on a priority for the communication to UE 310, SMF 316 can request transmission form resources (e.g., sound, light, radio, symbol discussed herein) from ANIC 312 via AMF 314, e.g., additional resources can be dedicated for ANIC 312 to locate useful reflective surfaces for the connection. In one or more embodiments, resources allocated to ANIC 312 can be adjusted based on different system requirements, e.g., additional resources can be allocated to increase the frequency with which discoveries of useful reflective surfaces occur. One having ordinary skill in the relevant art(s), given the description herein appreciates different types of applications that can require improved performance, e.g., applications with holographic communications, e-gaming, tele-health applications for live diagnostics, etc.

At 352, transmission form resources can be setup by communication between UE 310 and ANIC 312. At 354, ANIC 312 responds to the 350 request, e.g., an example response being a notification to core network resources regarding reflective surfaces are identified and can be potentially can be used during the call, even in a situation where UE 310 and/or reflective surface 250 are mobile. At 356, SMF 316 updates UPF 318 to setup a tunnel to ANIC 312. At 358, a user session can be established between UE 310 and UPF 318 via AN 312, AMF 314, SMF 316, and UPF 318.

In an example implementation, a user application can be installed on UE 310 to monitor the applications of UE 310 and, based on the workload and QoS and reliability requirements, the user application can notify a backend server to use UPF 318 to command ANIC 312 to dedicate additional system resources to placing reflective surfaces for better signal coverage. In a variation of this example, the user application can also monitor the communications of UE 310 for excessive packet loss or delay and can trigger the above noted resource allocations based on these conditions.

In one or more embodiments, preemptive activity can be performed to facilitate potentially required supplementation of communications signals by reflective signal bandwidth, e.g., utilizing a reachability management module of AMF 314 to track the position of UE 310 in relation to known and potentially useful reflective surfaces if UE 310 requires additional resources. Based on this tracking, AMF 314 can provide additional feedback to ANIC 312 regarding locations where reflective surfaces can be placed to be available for the supplementation of surface repository 125 can be utilized. Further to this end, in one or more embodiments, a security context management module of AMF 314 can conserve ANIC 312 resources by authenticating the service level allocated to UE 310, e.g., whether UE 310 has a higher priority designation, such as for public safety customers.

Figure 6:
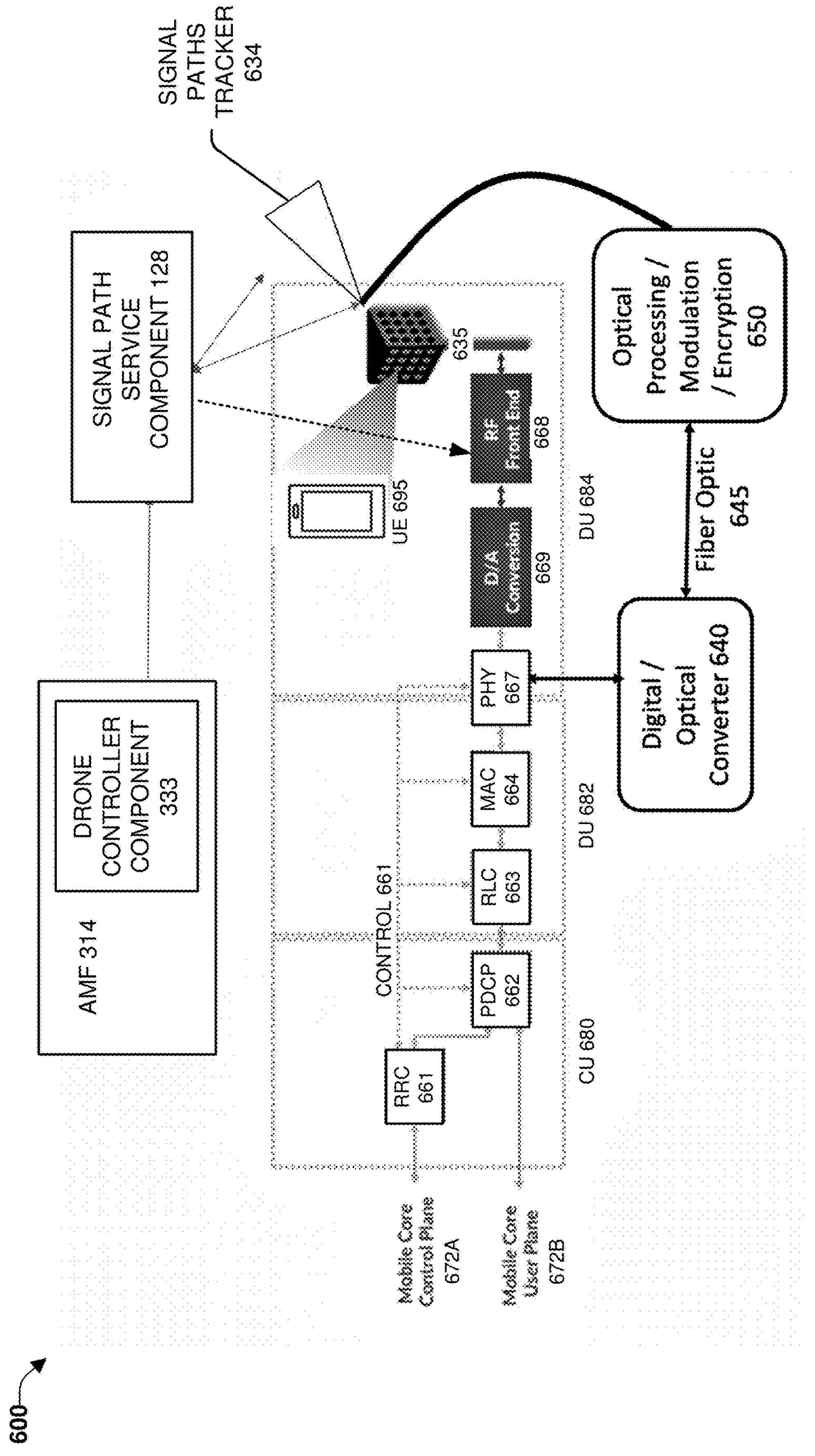
FIG. 6 is a diagram of a non-limiting example scheduler component that can facilitate an access point requesting a path and a mode for establishing communications with destination equipment, in accordance with one or more embodiments.

FIG. 6 is a diagram of a non-limiting example scheduler component 600 that can facilitate an access point requesting a path and a mode for establishing communications with destination equipment 175, in accordance with one or more embodiments. For purposes of brevity, description of like elements and/or processes employed in other embodiments is omitted. This figure includes digital scheduling functions in the distributed unit (DU) 682, which includes radio link control layer (RLC) 663, media access control layer (MAC) 664, physical layer (PHY) 667. Centralized unit (CU) 680, which includes packet data convergence protocol layer (PDCP) 662, radio resource control (RRC) 661, with these elements respectively connecting to mobile control planes 672A-B, and signal path service component 128 described with FIGS. 1-2 above.

Distributed unit 684 encompasses digital/analog conversion 669, radio frequency front-end 668, and signal-mode transceiver 635, e.g., with combinations of the mode transmitters and mode receiver discussed above. Additional components that enable different functions of embodiments include digital/optical converter 640 coupled by fiber optic 645 to optical processing, modulation, and encryption function components 650. Linking FIG. 6 to FIGS. 3-5, AMF 314 provides access management functions to signal-mode transceiver 635.

In one or more embodiments, digital/optical converter 640 can receive a digital traffic flow from 667, convert this flow to an optical signal for processing by optical processing, modulation, and encryption function components 650. Additional functions that can be performed with the optical signal include, but are not limited to, special modulation, multiplexing, and demultiplexing.

In one or more embodiments, functions of scheduler component 600 can be connected to the network core via AMF 314, with this component providing capabilities of the transmitting and receiving components, gNBs and UEs discussed herein. Different device capabilities that can be provided to AMF 314 include, but are not limited to, supported signaling modes, the signaling environment of the devices (e.g., signal saturation, and device movement). In one or more embodiments, scheduler component 600 can provide instructions to AMF 314 regarding different signaling modes. In one or more embodiments, scheduler component 600 can use machine learning approaches to analyze historical data and provide instructions to AMDS 314.

In one or more embodiments, scheduler component 600 can establish new ways to transmit and receive signal paths, enable rapid hopping between signal modes during a single call to improve call quality and allocation of resources, and reduce power consumption while improving communications speed. One having ordinary skill in the relevant art(s), given the description herein, appreciates that modern processing power can enable the rapid (e.g., changes made in milliseconds) selection and modification of factors including the surfaces selected for reflection, signals to be aimed, transmission strengths to be selected.

As depicted, scheduler component 600 can utilize signal paths tracker 634 which can use radar and other sensing equipment to scan the area around receiving equipment before communication via different signal modes. For example, before utilizing modulated lasers to communicate with a UE, one or more embodiments can scan the destination to prevent potential injury by the laser. In addition, signal paths tracker 634 can, based on the radar's input, this unit steers and example optical transceiver angle and direction to send and receive optical signal. This unit is connected to the core (e.g., AMF 314) to retrieve and access location information for destination equipment.

Figure 7:
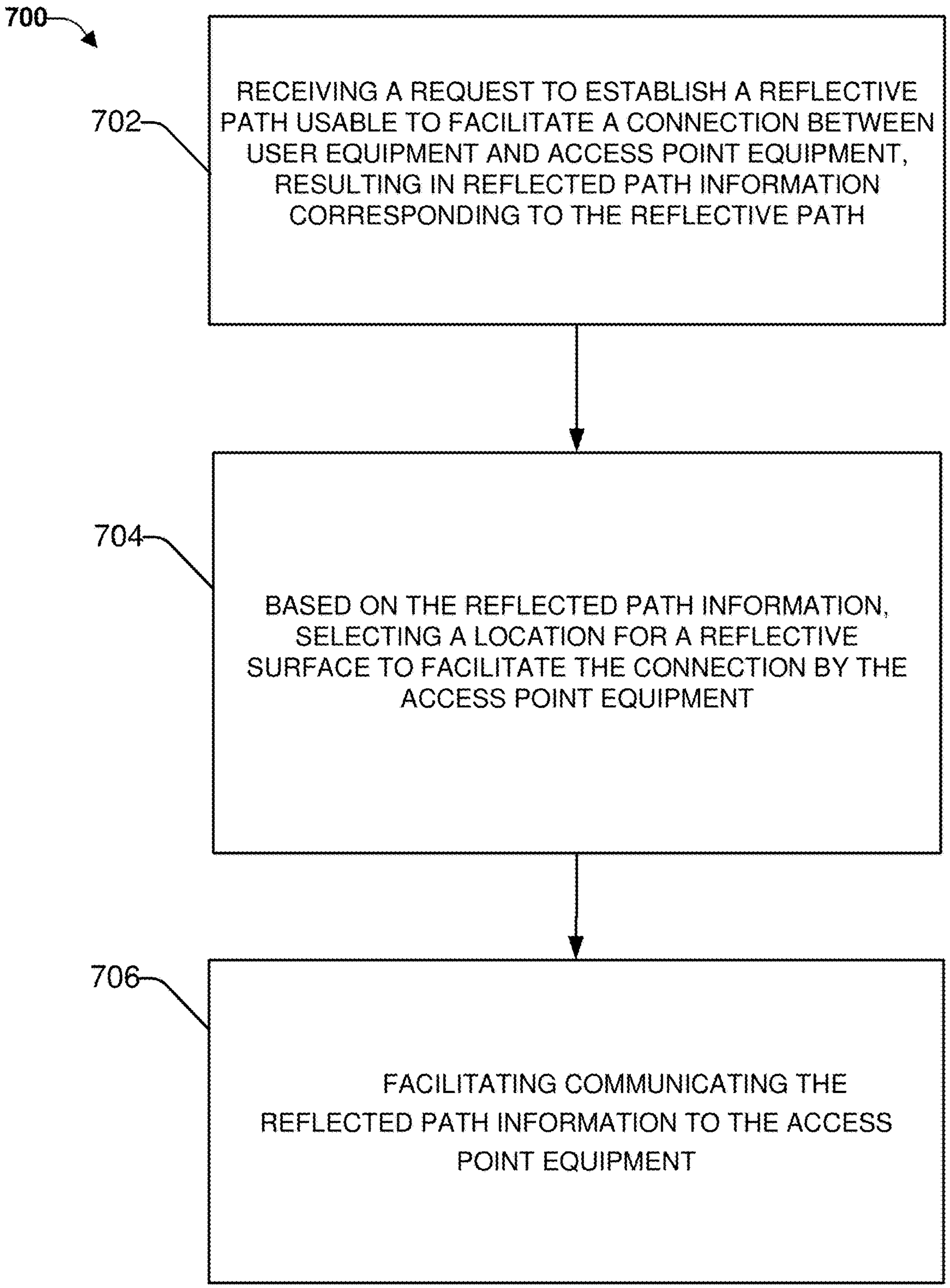
FIG. 7 illustrates an example method that can facilitate using unmanned mobile surfaces to reflect an access point signal to destination equipment, in accordance with one or more embodiments.

FIG. 7 illustrates an example method 700 that can facilitate using unmanned mobile surfaces to reflect an access point signal to destination equipment, in accordance with one or more embodiments. For purposes of brevity, description of like elements and/or processes employed in other embodiments is omitted.

At 702, method 700 can include receiving a request to establish a reflective path usable to facilitate a connection between user equipment and access point equipment, resulting in reflected path information corresponding to the reflective path. At 704, method 700 can include, based on the reflected path information, selecting a location for a reflective surface to facilitate the connection by the access point equipment. At 706, method 700 can include facilitating communicating the reflected path information to the access point equipment.

Additional, or alternative, embodiments can include, based on the reflected path information, positioning the reflective surface at the location.

In additional, or alternative, embodiments, the reflective surface equipment can include an unmanned aerial vehicle, and the method further comprises, based on the request to establish the reflective path, moving to the location for the positioning of the reflective surface at the location.

In additional, or alternative, embodiments, the reflected path information can include an estimated time that the access point equipment will utilize the reflective surface to establish the connection in accordance with the reflected path information, and, based on the estimated time, the reflective surface is comprised of a material that causes the reflective surface to comprise a transient reflective surface that ceases being usable to facilitate the connection by the access point equipment after a period of time selected based on the estimated time.

In additional, or alternative, embodiments, the material can include a reflective material that temporarily adheres to a selected surface to facilitate the selected surface comprising the transient reflective surface.

In additional, or alternative, embodiments, the reflective material can include a liquid material that temporarily adheres to the selected surface for the period of time.

In additional, or alternative, embodiments, the liquid material can include reflective paint comprising a paint color selected based on a color of the selected surface.

In additional, or alternative, embodiments, the reflective material can include a solid reflective structure that is adhered to the selected surface.

In additional, or alternative, embodiments, the solid reflective structure is formed by the reflective surface equipment in a shape comprising a geometric shape that tapers from a flat base to an apex point.

In additional, or alternative, embodiments, the solid reflective structure provides a capability of being remotely controlled to disable reflectivity of the solid reflective structure.

In additional, or alternative, embodiments, after the positioning, based on a disabling request to disable the reflectivity, controlling the solid reflective structure to disable the reflectivity, and the request was generated based on a predicted adverse effect associated with the connection by the access point equipment.

In additional, or alternative, embodiments, the reflected path information can include mode information corresponding to a mode of communication of a group of modes of communication for communicating by the access point equipment, and the reflective surface is comprised of the material further based on the mode of communication, and the method further comprises, based on a characteristic of the connection to be facilitated, selecting the mode of communication from the group of modes.

In additional, or alternative, embodiments, the mode of communication can include communication via an encoded wave in accordance with the mode of communication, and identifying the reflective surface can include identifying that the reflective surface can include a reflective surface usable to reflect the encoded wave, and the user equipment can include a receiver to facilitate receipt of the encoded wave received in accordance with the reflective path.

In additional, or alternative, embodiments, the mode of communication can include communication by a signal encoded in a beam of light.

Figure 8:
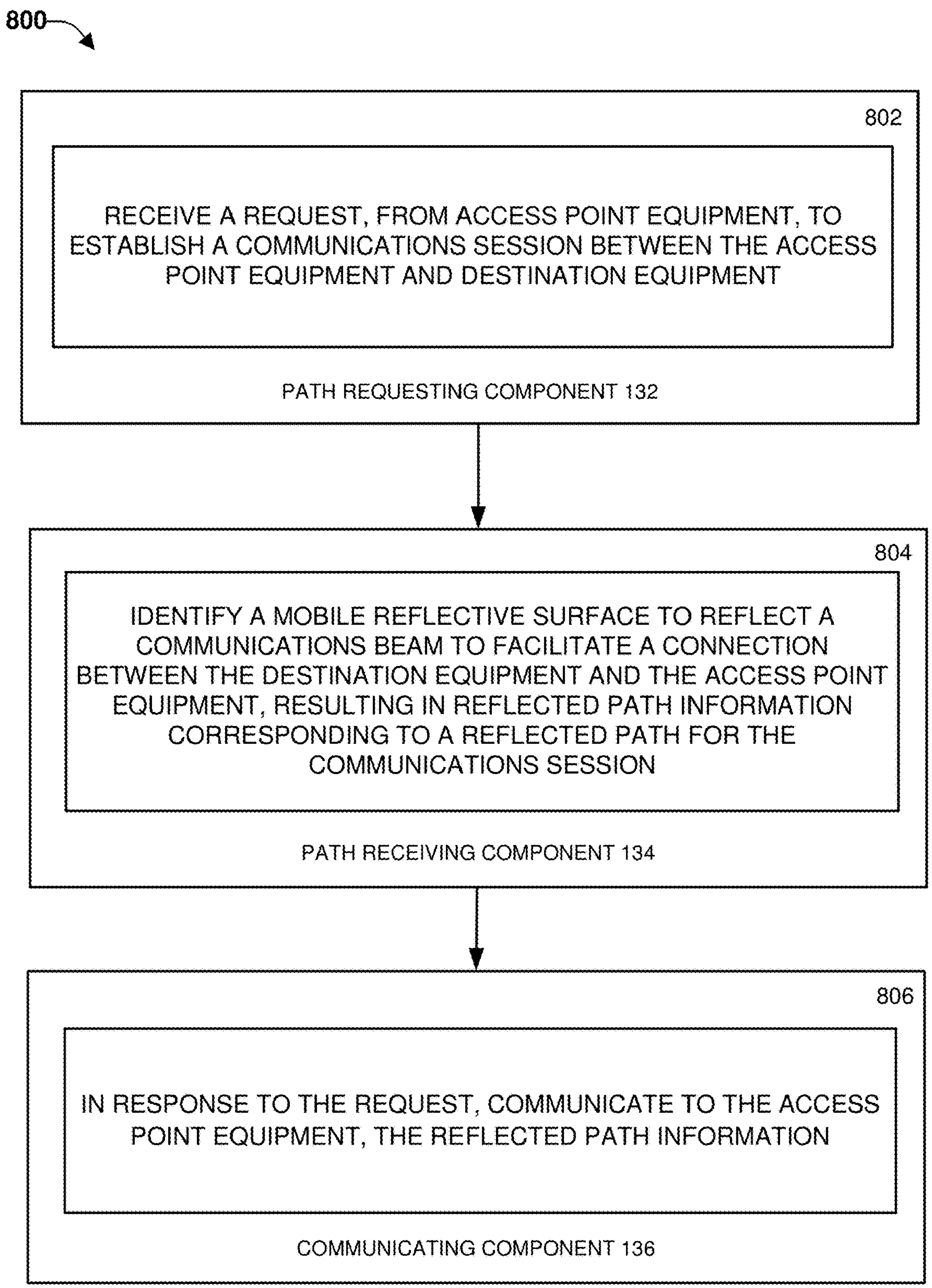
FIG. 8 depicts a system that can facilitate using unmanned mobile surfaces to reflect an access point signal to destination equipment, in accordance with one or more embodiments.

FIG. 8 depicts a system 800 that can facilitate using unmanned mobile surfaces to reflect an access point signal to destination equipment, in accordance with one or more embodiments. For purposes of brevity, description of like elements and/or processes employed in other embodiments is omitted. As depicted, system 800 can include path requesting component 132, path receiving component 134, communicating component 136, and other components described or suggested by different embodiments described herein, that can improve the operation of system 800.

In a non-limiting example, component 802 can include the functions of path requesting component 132, supported by the other layers of system 800. For example, component 802 can request, from a second network device, a path for a connection to a third network device, and the path can include a form of signal of the connection and a location of a surface usable to alter a direction of the form of signal, resulting in a selected path.

In a non-limiting example, component 804 can include the functions of path receiving component 134, supported by the other layers of system 800. For example, component 804 can receive from the second network device, the path to the third network device, and based on the selected path, the second network device generated a transient reflective surface at a geographic location to facilitate the connection to the third network device by relaying the form of signal in accordance with the selected path.

In a non-limiting example, component 806 can include the functions of communicating component 136, supported by the other layers of system 800. For example, component 806 can facilitate the connection being established with the third network device via the path by communicating a signal of the form of signal toward the geographic location.

In additional, or alternative, embodiments, the selected path can further include a time when the selected path is predicted to be operable to facilitate the connection.

In additional, or alternative, embodiments, the form of signal can include a type of electromagnetic wave, and the transient reflective surface was generated based on a property that indicated that the transient reflective surface reflects the type of electromagnetic wave, and the third network device can include a receiver that provides a capability of receiving the type of electromagnetic wave.

Figure 9:
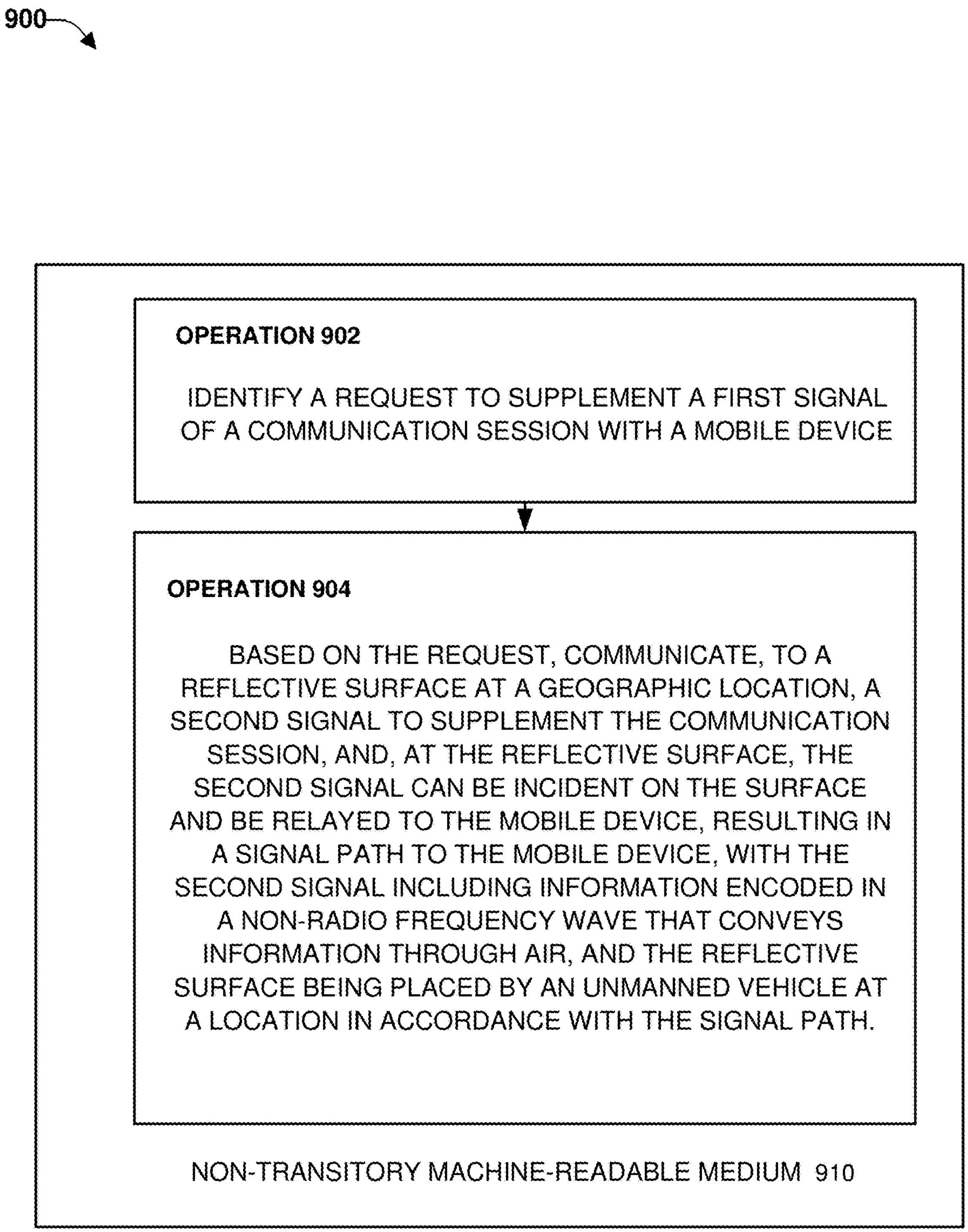
FIG. 9 depicts an example non-transitory machine-readable medium that can include executable instructions that, when executed by a processor of a system, facilitate using unmanned mobile surfaces to reflect an access point signal to destination equipment, in accordance with one or more embodiments described above.

FIG. 9 depicts an example 900 non-transitory machine-readable medium 910 that can include executable instructions that, when executed by a processor of a system, facilitate using unmanned mobile surfaces to reflect an access point signal to destination equipment, in accordance with one or more embodiments described above. For purposes of brevity, description of like elements and/or processes employed in other embodiments is omitted. As depicted, non-transitory machine-readable medium 910 includes executable instructions that can facilitate performance of operations 902-904.

In one or more embodiments, the operations can include operation 902 that can identify a request to supplement a first signal of a communication session with a mobile device.

In one or more embodiments, the operations can include operation 904 that can based on the request, communicate, to a reflective surface at a geographic location, a second signal to supplement the communication session, and, at the reflective surface, the second signal can be incident on the surface and be relayed to the mobile device, resulting in a signal path to the mobile device, with the second signal including information encoded in a non-radio frequency wave that conveys information through air, and the reflective surface being placed by an unmanned vehicle at a location in accordance with the signal path.

In additional, or alternative, embodiments, the reflective surface was generated by the unmanned vehicle based on a shape of a structural element of the geographic location.

In additional, or alternative, embodiments, the structural element can include an architectural element of a building.

Figure 10:
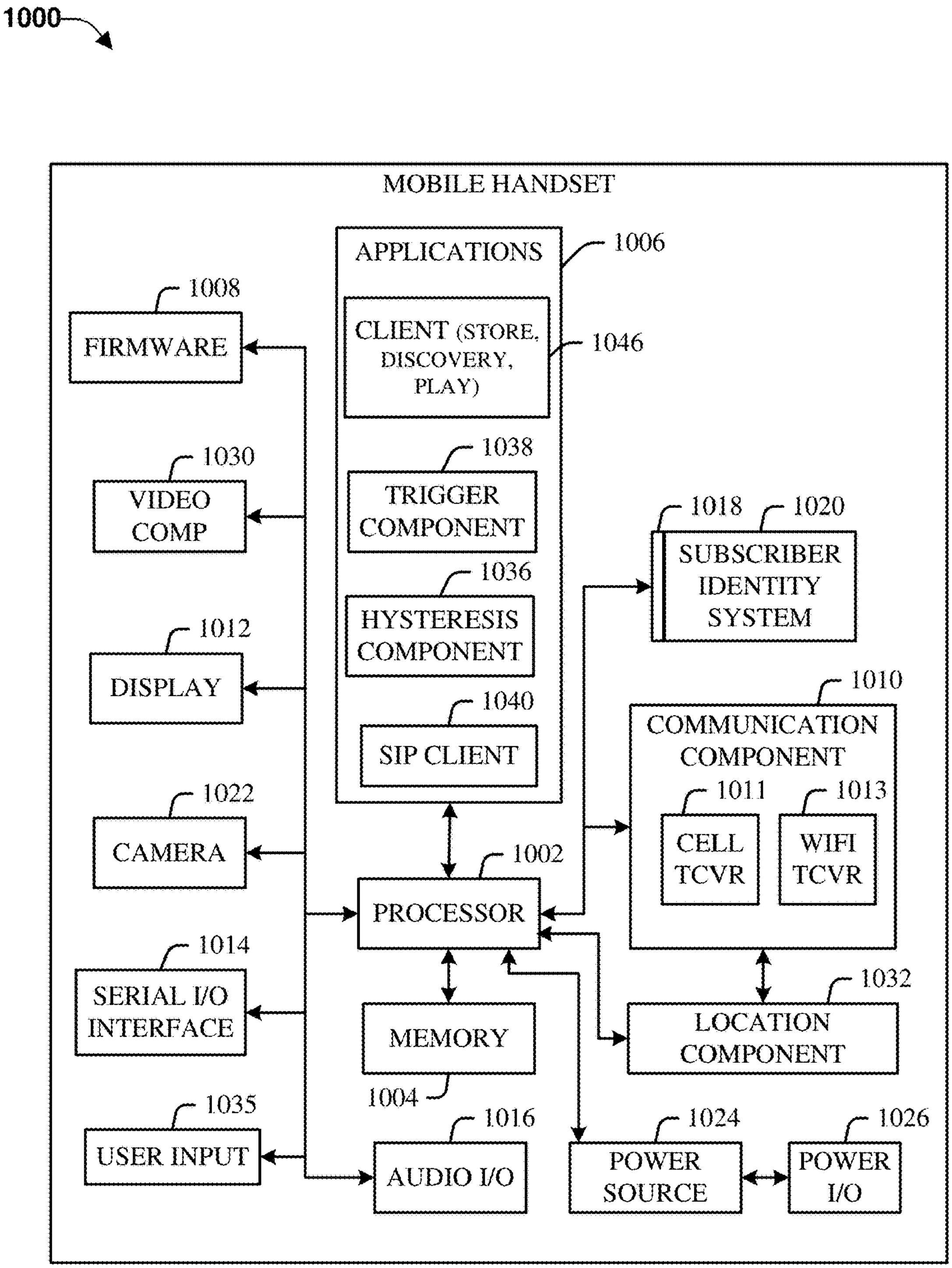
FIG. 10 illustrates an example block diagram of an example mobile handset operable to engage in a system architecture that can facilitate processes described herein, in accordance with one or more embodiments.

FIG. 10 illustrates an example block diagram of an example mobile handset 1000 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those with ordinary skill in the art will recognize that the embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those with ordinary skill in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 1002 for controlling and processing all onboard operations and functions. A memory 1004 interfaces to the processor 1002 for storage of data and one or more applications 1006 (e.g., a video player software, user feedback component software, etc.). Other applications can include voice recognition of predetermined voice commands that facilitate initiation of the user feedback signals. The applications 1006 can be stored in the memory 1004 and/or in a firmware 1008, and executed by the processor 1002 from either or both the memory 1004 or/and the firmware 1008. The firmware 1008 can also store startup code for execution in initializing the handset 1000. A communications component 1010 interfaces to the processor 1002 to facilitate wired/wireless communication with external systems, e.g., cellular networks, VoIP networks, and so on. Here, the communications component 1010 can also include a suitable cellular transceiver 1011 (e.g., a GSM transceiver) and/or an unlicensed transceiver 1013 (e.g., Wi-Fi, WiMax) for corresponding signal communications. The handset 1000 can be a device such as a cellular telephone, a PDA with mobile communications capabilities, and messaging-centric devices. The communications component 1010 also facilitates communications reception from terrestrial radio networks (e.g., broadcast), digital satellite radio networks, and Internet-based radio services networks The handset 1000 includes a display 1012 for displaying text, images, video, telephony functions (e.g., a Caller ID function), setup functions, and for user input. For example, the display 1012 can also be referred to as a "screen" that can accommodate the presentation of multimedia content (e.g., music metadata, messages, wallpaper, graphics, etc.). The display 1012 can also display videos and can facilitate the generation, editing and sharing of video quotes. A serial I/O interface 1014 is provided in communication with the processor 1002 to facilitate wired and/or wireless serial communications (e.g., USB, and/or IEEE 1294) through a hardwire connection, and other serial input devices (e.g., a keyboard, keypad, and mouse). This supports updating and troubleshooting the handset 1000, for example. Audio capabilities are provided with an audio I/O component 1016, which can include a speaker for the output of audio signals related to, for example, indication that the user pressed the proper key or key combination to initiate the user feedback signal. The audio I/O component 1016 also facilitates the input of audio signals through a microphone to record data and/or telephony voice data, and for inputting voice signals for telephone conversations.

The handset 1000 can include a slot interface 1018 for accommodating a SIC (Subscriber Identity Component) in the form factor of a card SIM or universal SIM 1020, and interfacing the SIM card 1020 with the processor 1002. However, it is to be appreciated that the SIM card 1020 can be manufactured into the handset 1000, and updated by downloading data and software.

The handset 1000 can process IP data traffic through the communications component 1010 to accommodate IP traffic from an IP network such as, for example, the Internet, a corporate intranet, a home network, a person area network, etc., through an ISP or broadband cable provider. Thus, VoIP traffic can be utilized by the handset 1000 and IP-based multimedia content can be received in either an encoded or a decoded format.

A video processing component 1022 (e.g., a camera) can be provided for decoding encoded multimedia content. The video processing component 1022 can aid in facilitating the generation, editing, and sharing of video quotes. The handset 1000 also includes a power source 1024 in the form of batteries and/or an AC power subsystem, which power source 1024 can interface to an external power system or charging equipment (not shown) by a power I/O component 1026.

The handset 1000 can also include a video component 1030 for processing video content received and, for recording and transmitting video content. For example, the video component 1030 can facilitate the generation, editing and sharing of video quotes. A location tracking component 1032 facilitates geographically locating the handset 1000. As described hereinabove, this can occur when the user initiates the feedback signal automatically or manually. A user input component 1034 facilitates the user initiating the quality feedback signal. The user input component 1034 can also facilitate the generation, editing and sharing of video quotes. The user input component 1034 can include such conventional input device technologies such as a keypad, keyboard, mouse, stylus pen, and/or touch screen, for example.

Referring again to the applications 1006, a hysteresis component 1036 facilitates the analysis and processing of hysteresis data, which is utilized to determine when to associate with the access point. A software trigger component 1038 can be provided that facilitates triggering of the hysteresis component 1036 when the Wi-Fi transceiver 1013 detects the beacon of the access point. A SIP client 1040 enables the handset 1000 to support SIP protocols and register the subscriber with the SIP registrar server. The applications 1006 can also include a client 1042 that provides at least the capability of discovery, play and store of multimedia content, for example, music.

The handset 1000, as indicated above related to the communications component 1010, includes an indoor network radio transceiver 1013 (e.g., Wi-Fi transceiver). This function supports the indoor radio link, such as IEEE 802.11, for the dual-mode GSM handset 1000. The handset 1000 can accommodate at least satellite radio services through a handset that can combine wireless voice and digital radio chipsets into a single handheld device.

Network 190 can employ various cellular systems, technologies, and modulation schemes to facilitate wireless radio communications between devices. While example embodiments include use of 5G NR systems, one or more embodiments discussed herein can be applicable to any RAT or multi-RAT system, including where user equipment operate using multiple carriers, e.g., LTE FDD/TDD, GSM/GERAN, CDMA2000, etc. For example, wireless communication system 200 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described with the devices of system 100 being configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the user equipment. The term carrier aggregation (CA) is also called (e.g., interchangeably called) “multi-carrier system”, “multi-cell operation”, “multi-carrier operation”, “multi-carrier” transmission and/or reception. Note that some embodiments are also applicable for Multi RAB (radio bearers) on some carriers (that is data plus speech is simultaneously scheduled).

Various embodiments described herein can be configured to provide and employ 5G wireless networking features and functionalities. With 5G networks that may use waveforms that split the bandwidth into several sub bands, different types of services can be accommodated in different sub bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Figure 11:
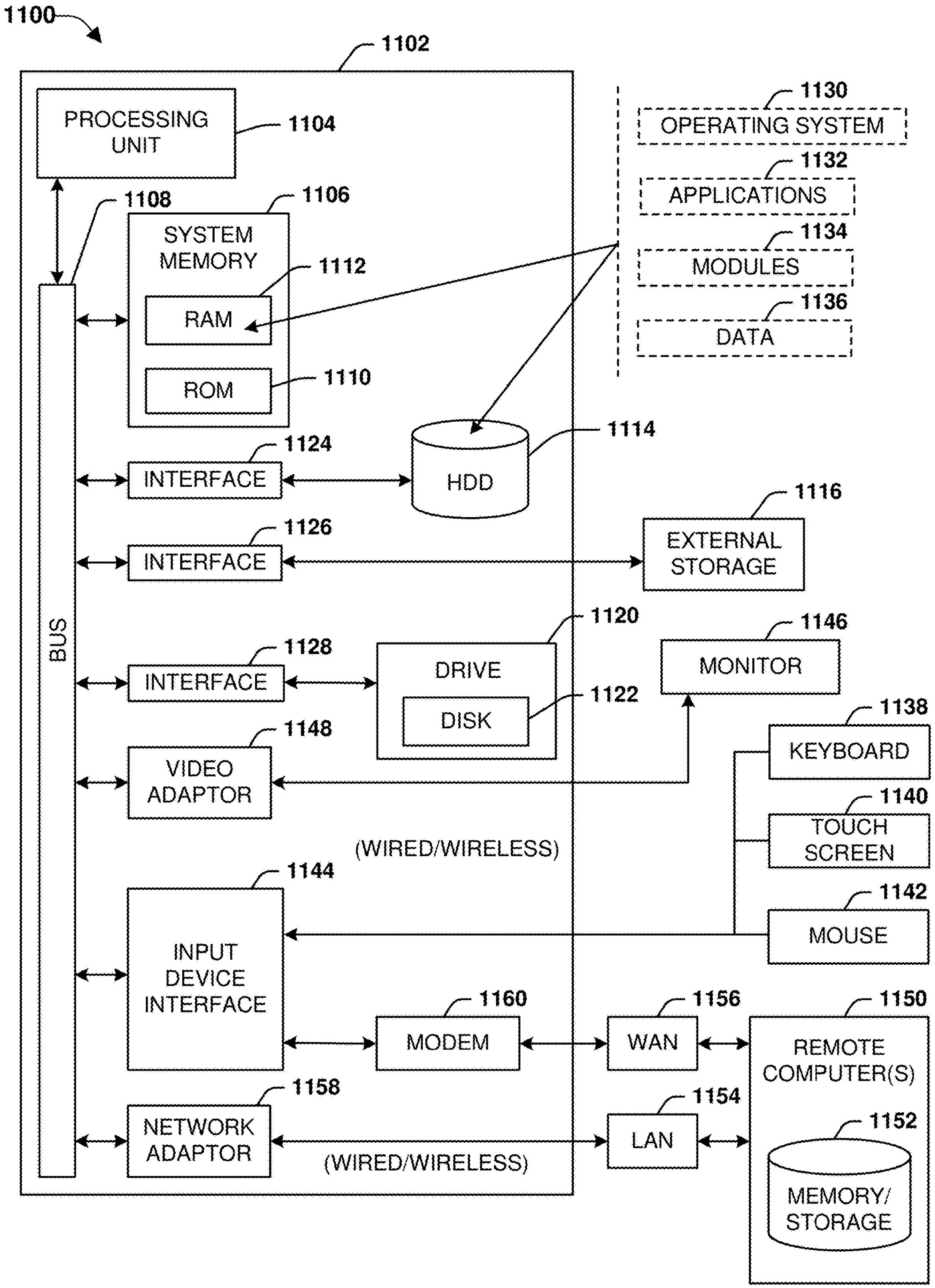
FIG. 11 illustrates an example block diagram of an example computer operable to engage in a system architecture that can facilitate processes described herein, in accordance with one or more embodiments.

FIG. 11 provides additional context for various embodiments described herein, intended to provide a brief, general description of a suitable operating environment 1100 in which the various embodiments of the embodiment described herein can be implemented. While the embodiments have been described above in the general context of computer-executable instructions that can run on one or more computers, those having ordinary skill in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those with ordinary skill in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media can include wired media, such as a wired network or direct-wired connection, as well as wireless media such as acoustic, RF, and infrared media.

With reference again to FIG. 11, the example operating environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and a drive 1120, e.g., such as a solid-state drive, an optical disk drive, which can read or write from a disk 1122, such as a CD-ROM disc, a DVD, a BD, etc. Alternatively, where a solid-state drive is involved, disk 1122 would not be included, unless separate. While the internal HDD 1114 is illustrated as located within the computer 1102, the internal HDD 1114 can also be configured for external use in a suitable chassis (not shown). Additionally, while not shown in environment 1100, a solid-state drive (SSD) could be used in addition to, or in place of, an HDD 1114. The HDD 1114, external storage device(s) 1116 and drive 1120 can be connected to the system bus 1108 by an HDD interface 1124, an external storage interface 1126 and a drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, it should be appreciated by those with ordinary skill in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In such an embodiment, operating system 930 can comprise one virtual machine (VM) of multiple VMs hosted at computer 902. Furthermore, operating system 930 can provide runtime environments, such as the Java runtime environment or the .NET framework, for applications 932. Runtime environments are consistent execution environments that allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and settings for an application.

Further, computer 902 can be enable with a security module, such as a trusted processing module (TPM). For instance, with a TPM, boot components hash next in time boot components, and wait for a match of results to secured values, before loading a next boot component. This process can take place at any layer in the code execution stack of computer 902, e.g., applied at the application execution level or at the operating system (OS) kernel level, thereby enabling security at any level of code execution.

A user can enter commands and information into the computer 902 through one or more wired/wireless input devices, e.g., a keyboard 938, a touch screen 940, and a pointing device, such as a mouse 942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 904 through an input device interface 944 that can be coupled to the system bus 908, but can be connected by other interfaces, such as a parallel port, an IEEE 1394 serial port, a game port, a USB port, an IR interface, a BLUETOOTH® interface, etc.

A monitor 946 or other type of display device can be also connected to the system bus 908 via an interface, such as a video adapter 948. In addition to the monitor 946, a computer typically includes other peripheral output devices (not shown), such as speakers, printers, etc.

The computer 902 can operate in a networked environment using logical connections via wired and/or wireless communications to one or more remote computers, such as a remote computer(s) 950. The remote computer(s) 950 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 952 is illustrated. The logical connections depicted include wired/wireless connectivity to a local area network (LAN) 954 and/or larger networks, e.g., a wide area network (WAN) 956. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 954 through a wired and/or wireless communication network interface or adapter 958. The adapter 958 can facilitate wired or wireless communication to the LAN 954, which can also include a wireless access point (AP) disposed thereon for communicating with the adapter 958 in a wireless mode.

When used in a WAN networking environment, the computer 902 can include a modem 960 or can be connected to a communications server on the WAN 956 via other means for establishing communications over the WAN 956, such as by way of the Internet. The modem 960, which can be internal or external and a wired or wireless device, can be connected to the system bus 908 via the input device interface 944. In a networked environment, program modules depicted relative to the computer 902 or portions thereof, can be stored in the remote memory/storage device 952. It will be appreciated that the network connections shown are example and other means of establishing a communications link between the computers can be used.

When used in either a LAN or WAN networking environment, the computer 902 can access cloud storage systems or other network-based storage systems in addition to, or in place of, external storage devices 916 as described above, such as but not limited to a network virtual machine providing one or more aspects of storage or processing of information. Generally, a connection between the computer 902 and a cloud storage system can be established over a LAN 954 or WAN 956 e.g., by the adapter 958 or modem 960, respectively. Upon connecting the computer 902 to an associated cloud storage system, the external storage interface 926 can, with the aid of the adapter 958 and/or modem 960, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those with ordinary skill in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Further to the description above, as it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine-readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipment do not normally connect directly to the core networks of a large service provider, but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third-party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used, or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be affected across a plurality of devices. Accordingly, the embodiments are not to be limited to any single implementation, but rather are to be construed in breadth, spirit and scope in accordance with the appended claims.

What is claimed is:

1. A method, comprising:

receiving, by reflective surface equipment comprising a processor, a request to establish a reflective path usable to facilitate a connection between user equipment and access point equipment, resulting in reflected path information corresponding to the reflective path;

based on the reflected path information, selecting, by the reflective surface equipment, a location for a reflective surface to facilitate the connection by the access point equipment, wherein the reflected path information comprises an estimated time that the access point equipment is to utilize the reflective surface to establish the connection in accordance with the reflected path information, and wherein, based on the estimated time, the reflective surface is comprised of a material that causes the reflective surface to comprise a transient reflective surface that ceases being usable to facilitate the connection by the access point equipment after a period of time selected based on the estimated time; and facilitating, by the reflective surface equipment, communicating the reflected path information to the access point equipment.

2. The method of claim 1, further comprising, based on the reflected path information, positioning, by the reflective surface equipment, the reflective surface at the location.

3. The method of claim 2, wherein the reflective surface equipment comprises an unmanned aerial vehicle, and wherein the method further comprises, based on the request to establish the reflective path, moving, by the reflective surface equipment, to the location for the positioning of the reflective surface at the location.

4. The method of claim 1, wherein the material comprises a reflective material that temporarily adheres to a selected surface to facilitate the selected surface at least in part being the transient reflective surface.

5. The method of claim 4, wherein the reflective material comprises a liquid material that temporarily adheres to the selected surface for the period of time.

6. The method of claim 5, wherein the liquid material comprises reflective paint comprising a paint color selected based on a color of the selected surface.

7. The method of claim 4, wherein the reflective material comprises a solid reflective structure that is adhered to the selected surface.

8. The method of claim 7, wherein the solid reflective structure is formed by the reflective surface equipment in a shape comprising a geometric shape that tapers from a flat base to an apex point.

9. The method of claim 7, wherein the solid reflective structure provides a capability of being remotely controlled to disable reflectivity of the solid reflective structure.

10. The method of claim 9, further comprising based on a disabling request to disable the reflectivity, controlling, by the reflective surface equipment, the solid reflective structure to disable the reflectivity, wherein the request was generated based on a predicted adverse effect associated with the connection by the access point equipment.

11. The method of claim 1, wherein the reflected path information comprises mode information corresponding to a mode of communication of a group of modes of communication for communication by the access point equipment, wherein the method further comprises, based on a characteristic of the connection to be facilitated, selecting, by the reflective surface equipment, the mode of communication from the group of modes, and wherein the reflective surface is comprised of the material further based on the mode of communication.

12. The method of claim 11, wherein the mode of communication comprises communication via an encoded wave in accordance with the mode of communication, wherein identifying the reflective surface comprises identifying that the reflective surface comprises a reflective surface usable to reflect the encoded wave, and wherein the user equipment comprises a receiver to facilitate receipt of the encoded wave received in accordance with the reflective path.

13. The method of claim 11, wherein the mode of communication is a mode that communicates using a signal encoded in a beam of light.

14. A device, comprising:

a processor; and a memory that stores executable instructions that, when executed by the processor, facilitate performance of operations, comprising:

receiving a request to establish a reflective path usable to facilitate a connection between user equipment and access point equipment, resulting in reflected path information corresponding to the reflective path;

based on the reflected path information, selecting a location for a reflective surface to facilitate the connection, wherein the reflected path information comprises an estimated time that the access point equipment is to utilize the reflective surface to establish the connection in accordance with the reflected path information, and wherein, based on the estimated time, the reflective surface is comprised of a material that causes the reflective surface to comprise a transient reflective surface that ceases being usable to facilitate the connection by the access point equipment after a period of time selected based on the estimated time; and communicating the reflected path information to the access point equipment.

15. The device of claim 14, wherein the operations further comprise:

based on the reflected path information, positioning the reflective surface at the location.

16. The device of claim 15, wherein the reflective surface is included as part of an unmanned aerial vehicle.

17. The device of claim 14, wherein the material comprises a reflective material that temporarily adheres to a selected surface to facilitate the selected surface at least in part being the transient reflective surface.

18. A non-transitory machine-readable medium, comprising executable instructions that, when executed by a processor, facilitate performance of operations, the operations comprising:

receiving a request to establish a reflective path usable to facilitate a connection involving an access point equipment, resulting in reflected path information corresponding to the reflective path;

based on the reflected path information, selecting a location for a reflective surface to facilitate the connection by the access point equipment, wherein the reflected path information comprises an estimated time that the access point equipment is to utilize the reflective surface to establish the connection in accordance with the reflected path information, and wherein, based on the estimated time, the reflective surface is comprised of a material that causes the reflective surface to comprise a transient reflective surface that ceases being usable to facilitate the connection by the access point equipment after a period of time selected based on the estimated time; and facilitating communicating the reflected path information to the access point equipment.

19. The non-transitory machine-readable medium of claim 18, wherein the operations further comprise:

based on the reflected path information, positioning the reflective surface at the location.

20. The non-transitory machine-readable medium of claim 18, wherein the reflective surface is included as part of an unmanned aerial vehicle.

* * * * *